(12) United States Patent
Yoshigahara et al.

(10) Patent No.: US 7,015,951 B1
(45) Date of Patent: Mar. 21, 2006

(54) PICTURE GENERATING APPARATUS AND PICTURE GENERATING METHOD

(75) Inventors: Takayuki Yoshigahara, Tokyo (JP); Toshifumi Fujita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/462,345

(22) PCT Filed: May 7, 1999

(86) PCT No.: PCT/JP99/02381

§ 371 (c)(1),
(2), (4) Date: Jan. 7, 2000

(87) PCT Pub. No.: WO99/58927

PCT Pub. Date: Nov. 18, 1999

(30) Foreign Application Priority Data

May 8, 1998 (JP) ............................... P10-126237

(51) Int. Cl.
*H04N 5/225* (2006.01)
*H04N 13/02* (2006.01)
*H04N 15/00* (2006.01)
*H04N 7/18* (2006.01)
*G06K 9/00* (2006.01)

(52) U.S. Cl. .................. 348/207.99; 348/47; 348/187; 348/135; 382/154

(58) Field of Classification Search ................. 348/187, 348/135–137, 633, 42–48, 140–143, 153, 348/159, 207.99, 169; 382/154, 278, 284–285, 382/219–220; 396/89, 121, 128
See application file for complete search history.

(56) References Cited

U.S. PATENT DOCUMENTS

| | | | | |
|---|---|---|---|---|
| 4,825,393 A | * | 4/1989 | Nishiya | 702/152 |
| 5,383,013 A | * | 1/1995 | Cox | 356/2 |
| 5,389,996 A | * | 2/1995 | Oda et al. | 396/120 |
| 5,424,773 A | * | 6/1995 | Saito | 348/218.1 |
| 5,577,130 A | * | 11/1996 | Wu | 382/106 |
| 5,667,474 A | * | 9/1997 | Nishimura | 600/109 |
| 5,680,474 A | * | 10/1997 | Iijima et al. | 382/154 |
| 5,703,961 A | * | 12/1997 | Rogina et al. | 382/154 |
| 5,745,126 A | * | 4/1998 | Jain et al. | 382/154 |
| 5,940,634 A | * | 8/1999 | Nakamura | 396/104 |
| 5,963,664 A | * | 10/1999 | Kumar et al. | 382/154 |

(Continued)

FOREIGN PATENT DOCUMENTS

JP    7-19832    1/1995

(Continued)

*Primary Examiner*—Ngoc-Yen Vu
*Assistant Examiner*—Kelly Jerabek
(74) *Attorney, Agent, or Firm*—Bell, Boyd & Lloyd LLC

(57) ABSTRACT

A picture generating apparatus according to this invention comprises: two image pick-up devices 3a, 3b or more adapted for picking up image of an object 2 to be imaged to generate picture data and respectively disposed at different positions; a correlation detecting section 5 for comparing, with each other, respective picture data generated by the respective image pick-up devices 3a, 3b on epipolar line determined by connecting correspondence points of line of sight connecting virtual position A and the object 2 to be imaged and line of sight connecting position of each of the image pick-up devices 3a, 3b and the object 2 to be imaged to detect correlation therebetween; and a distance picture generating section 5 for generating distance picture indicating distance between virtual position and the object to be imaged on the basis of correlation detected by the correlation detecting section 5.

18 Claims, 12 Drawing Sheets

U.S. PATENT DOCUMENTS

| | | | |
|---|---|---|---|
| 6,133,945 A * | 10/2000 | Stuettler | 348/51 |
| 6,233,004 B1 * | 5/2001 | Tanaka et al. | 348/48 |
| 6,263,100 B1 * | 7/2001 | Oshino et al. | 382/154 |
| 6,266,068 B1 * | 7/2001 | Kang et al. | 345/629 |
| 6,323,895 B1 * | 11/2001 | Sata | 348/39 |
| 6,476,812 B1 * | 11/2002 | Yoshigahara et al. | 345/427 |
| 6,483,949 B1 * | 11/2002 | Yokoyama et al. | 382/278 |
| 6,522,787 B1 * | 2/2003 | Kumar et al. | 382/268 |
| 6,587,183 B1 * | 7/2003 | Uomori et al. | 356/3.1 |
| 6,801,653 B1 * | 10/2004 | Wu et al. | 382/154 |
| 6,839,081 B1 * | 1/2005 | Iijima et al. | 348/46 |
| 2002/0085747 A1 * | 7/2002 | Yoshigahara et al. | 382/154 |
| 2002/0113865 A1 * | 8/2002 | Yano et al. | 348/47 |

FOREIGN PATENT DOCUMENTS

| | | |
|---|---|---|
| JP | 408233527 A * | 9/1996 |
| JP | 10-240934 | 9/1998 |
| JP | 10-334244 | 12/1998 |
| JP | 11-53549 | 2/1999 |
| JP | 11264724 A * | 9/1999 |

* cited by examiner

PRIOR ART

| | $n_b$ | |
|---|---|---|
| DISTANCE | DETECTION CAMERA 3a | DETECTION CAMERA 3b |
| $Z_1$ | $n_{d1}$ | $n_{d1}$ |
| $Z_2$ | $n_{d2}$ | $n_{d2}$ |
| $Z_3$ | $n_{d3}$ | $n_{d3}$ |
| ⋮ | ⋮ | ⋮ |

FIG. 9

PICTURE GENERATING APPARATUS AND PICTURE GENERATING METHOD

TECHNICAL FIELD

This invention relates to a picture generating apparatus and a picture generating method for generating distance picture and variable-density (gradation) picture by employing the stereo method, and relates to a picture generating apparatus and a picture generating method for generating distance picture indicating distance between virtual position and object to be imaged and variable-density (gradation) picture when object to be imaged is imaged from virtual position by using two cameras or more.

BACKGROUND ART

As an apparatus using the technique generally called stereo method, there is known, e.g., distance measurement unit (apparatus) for generating distance information from the camera unit up to object to be imaged. In this distance measurement unit, in order to measure three-dimensional coordinate position of the surface of object to be imaged, i.e., three dimensional shape thereof, pictures obtained by imaging, at the same time, the same object to be imaged by plural camera units having different view points are used to determine correspondence points corresponding to each other every respective pixels between those pictures to obtain distance information from the distance measurement unit up to the object to be imaged by that parallax.

In the prior art, there will be explained the representative first technique for generating distance picture consisting of distance information and variable-density picture consisting of luminance information, etc. by camera unit disposed at virtual position and in virtual direction. At the time of generating distance picture and variable-density picture, three-dimensional measurement is first carried out by imaging object to be imaged by means of plural camera units. Then, spatial coordinates (shape) of object to be imaged are determined. Then, an approach is employed to virtually dispose camera unit within that space to generate, by using spatial coordinates (shape) of the object to be imaged, distance picture to be observed by the camera unit virtually disposed, and to generate variable-density picture.

Explanation will now be given in connection with the second technique in which the stereo method is employed to generally determine distance picture with respect to object to be imaged. In this case, explanation will be given in connection with the example where, for the brevity of explanation, reference camera and detection camera for detecting distance between the reference camera and object to be imaged are used to determine correspondence points to generate distance picture.

First, such an approach is employed to image (pick up image of) object to be imaged by reference camera and detection camera disposed at positions different from each other to extract a predetermined area from picture data obtained by the reference camera to successively shift picture data of the extracted predetermined area on picture of the detection camera. At this time, the picture of the predetermined area is shifted on line called epipolar line determined by internal parameters and/or positional relationship of the detection camera. By successively shifting the picture of predetermined area on picture of the detection camera in this way, picture of the predetermined area imaged by the reference camera and picture imaged by the detection camera are compared with each other to determine degree of correspondence. Further, displacement quantity at displacement position where degree of correspondence is the highest is set as parallax at central pixel of the picture of the extracted predetermined area. In addition, by repeating these processing with respect to respective pixels of picture of the reference camera, distance pictures are generated.

Namely, as shown in FIG. 1, object to be imaged is observed by reference camera and detection camera. When it is recognized that point P within the three-dimensional picture is observed at image pick-up point $n_b$ by the reference camera, and is observed at image pick-up point $n_d$ by the detection camera, it is possible to determine three-dimensional position of the point P. In this case, it is not easy to judge (discriminate) that the corresponding point is image pick-up point $n_d$ of the detection camera corresponding to image pick-up point $n_b$ of the reference camera. This is called correspondence point problem in the stereoscopic view.

At the time of retrieving (searching) correspondence point generally carried out, image pick-up point $n_d$ exists, as is clear with reference to FIG. 1, on line where plane determined by line of sight of the reference camera and angle of visibility of the detection camera and image pick-up plane (surface) of the detection camera intersect (cross) with each other. This line is called epipolar line. Further, when positional relationship between the reference camera and the detection camera and parameters inherent in respective cameras (focal distance or length, etc.) are known, it is possible to determine epipolar line on picture surface of detection camera every respective image pick-up points $n_b$ of the reference camera. It is thus sufficient to carry out retrieval of correspondence points on this epipolar line.

An example where correspondence point of image pick-up point $n_b$ on picture imaged by the reference camera is detected on picture imaged by the detection camera will now be described. At this time, as shown in FIG. 2, with small area 100 around image pick-up point $n_b$ of the reference camera being as template, correlation (correlative) values are determined at several points on the epipolar line of picture of the detection camera. In this case, resolution of the epipolar line, i.e., resolution of distance are six points of image pick-up points $n_{d1}$ to $n_{d6}$, and those image pick-up points $n_{d1}$ to $n_{d6}$ correspond to distance numbers 1 to 6 corresponding to distances from the reference camera. Further, these distance numbers 1 to 6 correspond to distances on the line of sight from the reference camera. When I(x) is assumed to be luminance value of picture imaged by reference camera and I'(x') is assumed to be luminance value of picture imaged by detection camera, correlation is calculated by the following formula (1).

$$\sum_{i \in W} |I(x+i) - I'(x'+i)| \qquad (1)$$

In accordance with the formula (1), according as correlation becomes larger (higher), degree of correspondence between picture imaged by the reference camera and picture imaged by the detection camera becomes higher, and according as correlation becomes smaller (lower), the degree of correspondence becomes lower. In addition, parameter corresponding to the degree of correspondence is assumed to be evaluation value. The relationship between the evaluation value and respective image pick-up points $n_{d1}$ to $n_{d6}$ on the epipolar line is shown in FIG. 3. In this case, according as correlation becomes smaller (lower), the evaluation value becomes larger, and according as correlation becomes larger (higher), the evaluation value becomes smaller.

In accordance with this FIG. 3, image pick-up point $n_d$ corresponding to the point in which evaluation value based on the correlation calculated by the formula (I) is the lowest (minimum) is assumed to be correspondence point. In this case, the distance number is "3". Alternatively, while distance corresponding to the point where evaluation value is the minimum may be determined from respective image pick-up points $n_d$ as previously described, there are also instances where interpolation between sampled data is carried out from values at the periphery where the evaluation value is minimum to determine minimum value. By determining distance of picture that the reference camera has imaged from the reference camera and the detection camera in this way, distance picture is generated along with variable-density picture having luminance information.

However, in the first technique for generating distance picture consisting of distance information and variable-density picture consisting of luminance information, etc. by camera unit disposed at the above-described virtual position and in virtual direction, since such an approach is employed to develop (expand) object to be imaged into three-dimensional picture to generate distance pictures by using three-dimensional pictures obtained by carrying out developing (expansion) in a three-dimensional manner, vast amount of calculations are required. Moreover, in this first technique, when three-dimensional measurement is carried out with respect to object to be imaged which has been imaged by plural camera units, it is necessary to image all coordinates which can be observed from the virtual camera unit, and three-dimensional measurements must be thus carried out from many view points. Further, in the first technique, it is also necessary to paste together pictures imaged by respective camera units when three-dimensional picture is generated.

In addition, in the second technique which has been explained with reference to FIGS. 1 to 3, since such an approach is employed to shift picture imaged by the detection camera with picture imaged by the reference camera being as template to retrieve picture to thereby generate distance picture, existence of the reference camera is indispensable.

DISCLOSURE OF THE INVENTION

This invention has been made in view of actual circumstances as described above, and its object is to provide a picture generating apparatus and a picture generating method capable of generating, by only detection cameras, without using reference camera, distance picture indicating distance from the position where the reference camera is primarily disposed up to object to be imaged and variable-density (gradation) picture when object to be imaged is imaged from the reference camera.

In order to attain the object as described above, a picture generating apparatus according to this invention comprises: two image pick-up means or more adapted for imaging (picking up image of) object to be imaged to generate picture data and respectively disposed at different positions; correlation detecting means for comparing, with each other, on epipolar line determined by connecting correspondence points of line of sight connecting virtual position and the object to be imaged and line of sight connecting positions of each of the imaging means and the object to be imaged, respective picture data generated by the respective image pick-up means to detect correlation therebetween; and distance picture generating means for generating distance picture indicating distance between the virtual position and the object to be imaged on the basis of the correlation detected by the correlation detecting means.

In accordance with such a picture generating apparatus, picture data generated by two image pick-up means or more are used to compare, at the correlation detecting means, picture data generated by the respective image pick-up means to generate distance picture indicating distance between virtual position and object to be imaged at the distance picture generating means.

A picture generating method according to this invention comprises: imaging (picking up image of) object to be imaged by two (solid-state) image pick-up means (devices) or more respectively disposed at different positions to generate picture data; comparing, with each other, on epipolar line determined by connecting correspondence points of line of sight connecting virtual position and the object to be imaged and line of sight connecting positions of each of the image pick-up means and the object to be imaged, respective picture data generated by the respective image pick-up means to detect correlation therebetween; and generating distance picture indicating distance between virtual position and the object to be imaged on the basis of the detected correlation.

In accordance with such picture generating method, such a procedure is taken to compare picture data generated by two (solid-state) image pick-up (imaging) means (devices) or more to detect correlation therebetween to generate distance picture indicating distance between virtual position and object to be imaged on the basis of the correlation.

Still further objects of this invention and more practical merits obtained by this invention will be more apparent from the embodiments which will be described below.

BRIEF DESCRIPTION OF THE DRAWINGS

FIG. 9 is a view for explaining an example of look-up Table generated by the calibration unit.

BEST MODE FOR CARRYING OUT THE INVENTION

Explanation will be given below in detail with reference to the attached drawings in connection with an embodiment of this invention.

Figure 1:
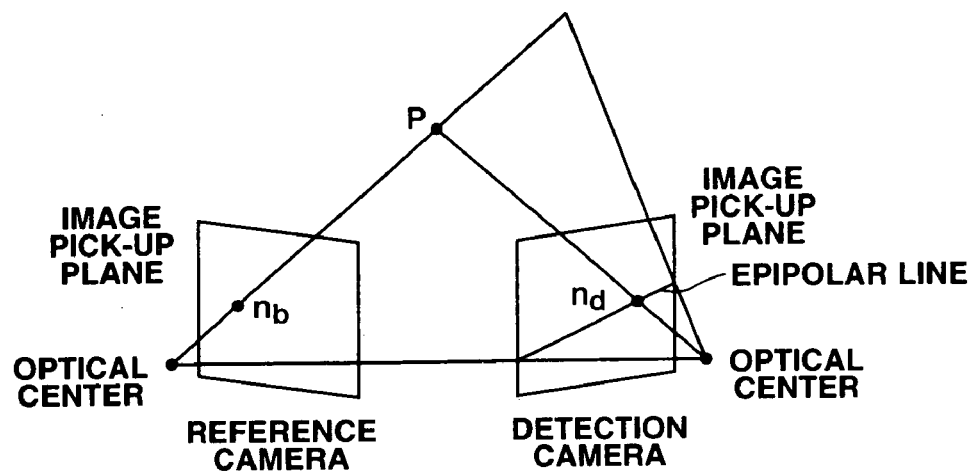
FIG. 1 is a view for explaining generation of distance information indicating distance between reference camera and object to be imaged by using reference camera and detection camera by the conventional technique.
Figure 2A:
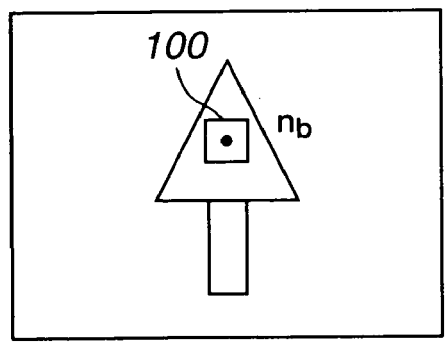
FIG. 2A is a view for explaining that small area around image pick-up point of reference camera is caused to undergo template and FIG. 2B is a view for explaining determination of correlation values by several points on epipolar line set on picture (on screen) of detection camera.
Figure 2B:
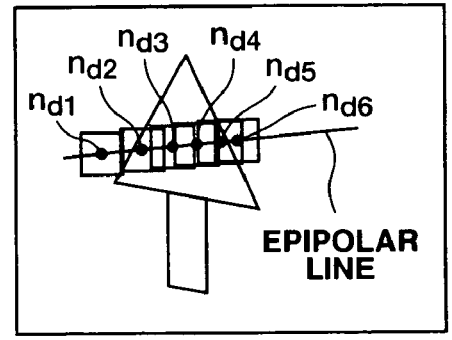
Figure 3:
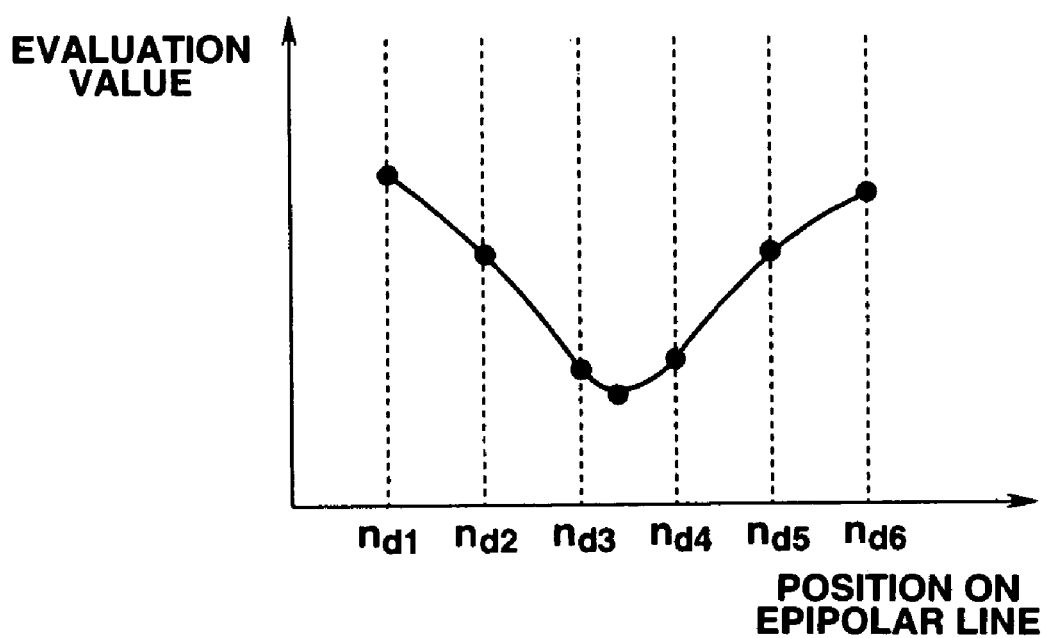
FIG. 3 is a view showing the relationship between evaluation values and positions at several points on epipolar line.
Figure 4:
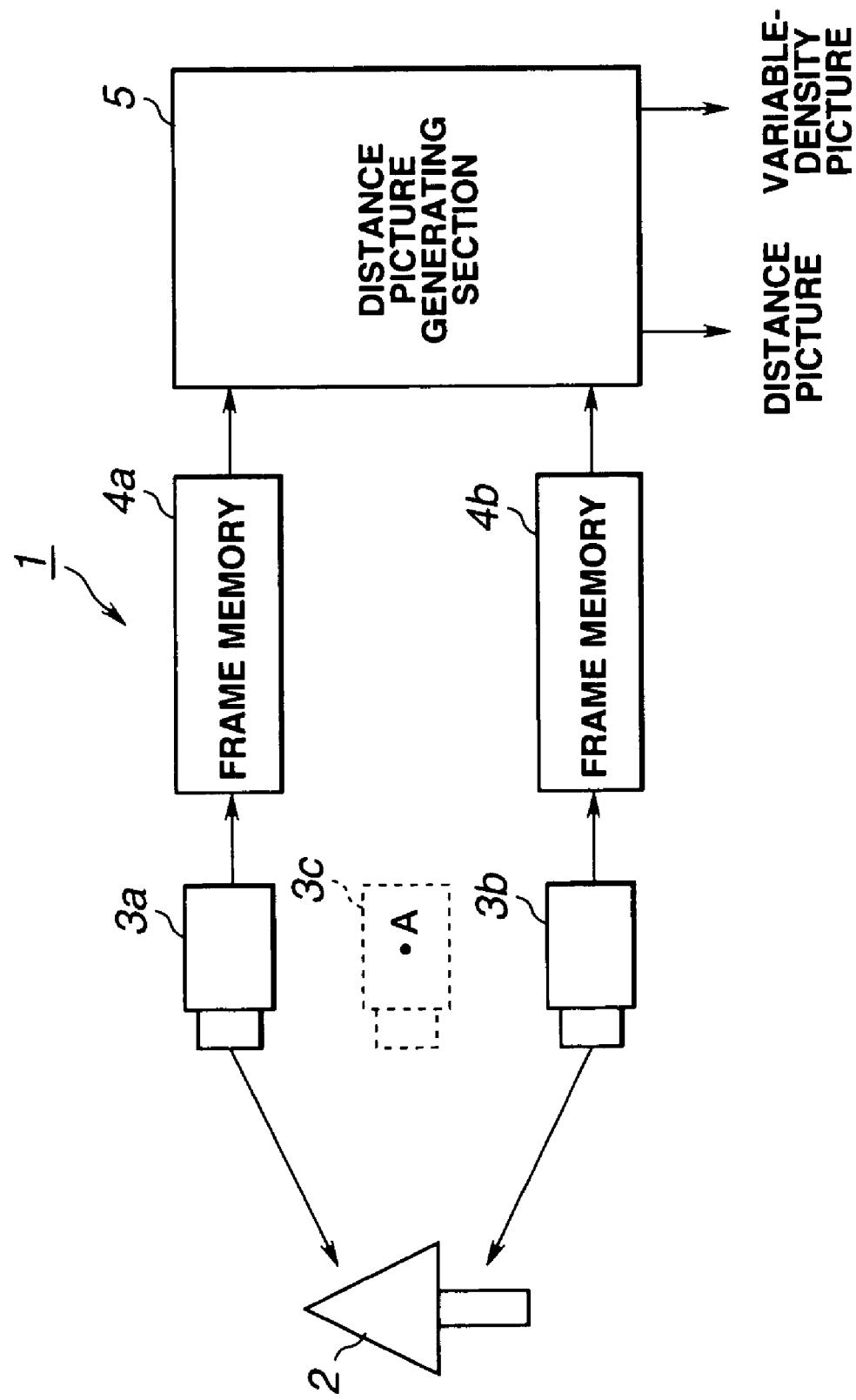
FIG. 4 is a block diagram showing an example of a picture generating apparatus according to this invention.

This invention is applied to a picture generating apparatus (unit) 1 constituted as shown in FIG. 4, for example, and used when distance is measured to generate distance picture. This picture generating apparatus 1 comprises plural detection cameras 3 (3a, 3b) for imaging (picking up image of) object 2 to be imaged, frame memories 4a, 4b into which picture data imaged by the plural detection cameras 3 are respectively stored, and a distance picture generating section 5 for generating distance picture and variable-density (gradation) picture by using picture data stored in the frame memories 4a, 4b. The picture generating unit (apparatus) 1 is adapted for imaging (picking up image of) the object 2 to be imaged by the detection cameras 3a, 3b to thereby generate distance picture and variable-density picture (hereinafter referred to as "virtual picture") to be imaged by a virtual camera 3c which is virtually disposed at virtual point A and does not exist.

The detection cameras 3a, 3b comprise, e.g., CCD image sensor, etc. and serve to pick up image of object 2 to be imaged to thereby generate picture consisting of luminance information, etc. (hereinafter referred to as "detection picture") to store data of the picture into the frame memories 4a, 4b. At this time, the detection cameras 3a, 3b respectively store the picture data thus generated into the frame memories 4a, 4b every frame.

Plural detection cameras 3a, 3b are disposed at positions different from the virtual point A in FIG. 4. In this example, detection cameras 3 are disposed at positions different from each other as the detection cameras 3a, 3b. It is to be noted that the positions where these detection cameras 3a, 3b are disposed and the number of cameras are not limited to the above, but they may be arbitrarily set.

The frame memories 4 (4a, 4b) respectively store thereinto picture data from the detection cameras 3a, 3b to output them to the distance picture generating section 5.

The distance picture generating section 5 processes picture data from the frame memories 4a, 4b to thereby generate virtual picture generated at virtual camera 3c.

Figure 5:
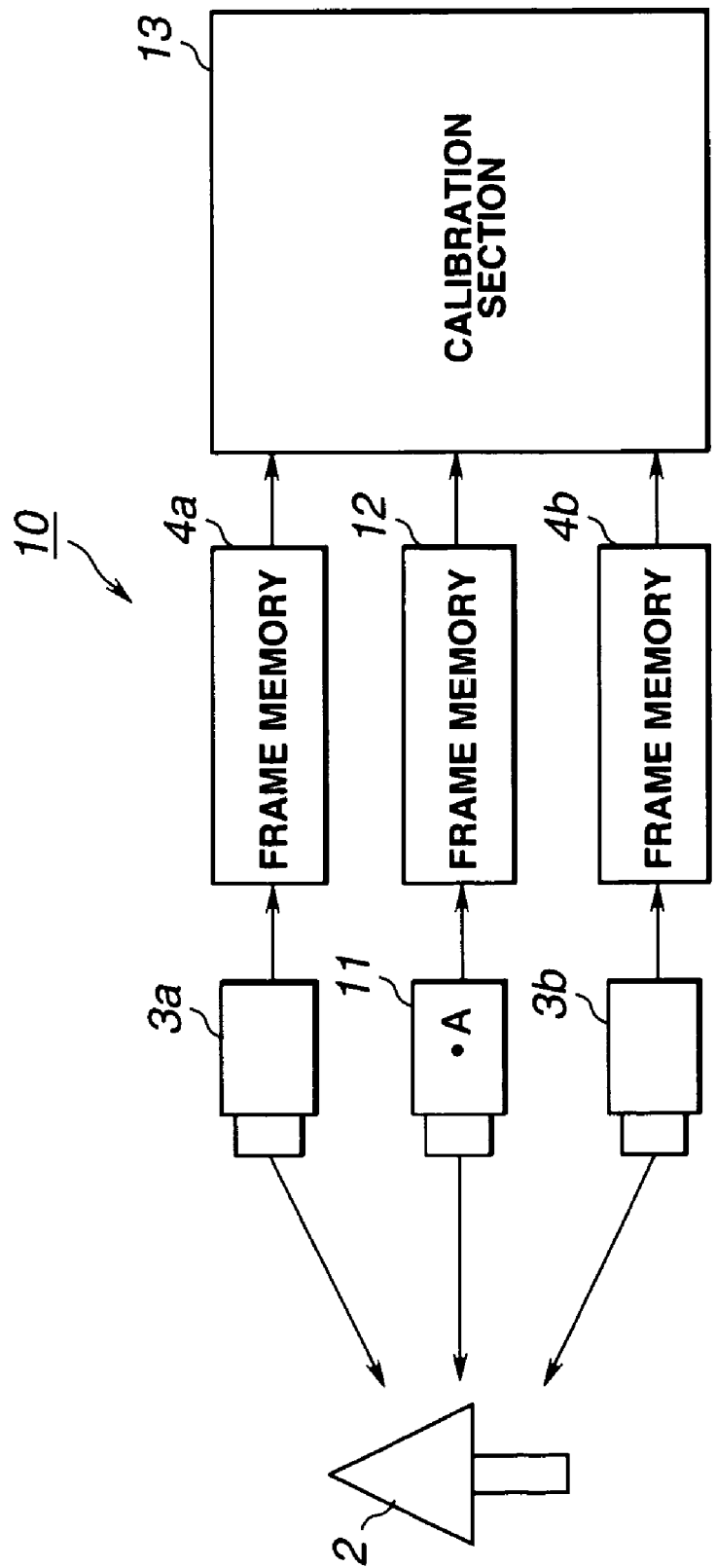
FIG. 5 is a block diagram showing an example of calibration unit for carrying out calibration on the premise that distance picture and variable-density picture are generated at virtual point A.

Explanation will now be given with reference to the calibration unit 10 of FIG. 5 in connection with calibration carried out on the premise that distance picture and variable-density picture at virtual point A are generated at the distance picture generating section 5 provided in the above-described picture generating unit 1 shown in FIG. 4. It should be noted that, in the explanation of the calibration unit 10, the same reference numerals are respectively attached to the portions similar to those of the above-described picture generating unit 1 and their detailed explanation will be omitted.

The calibration unit (apparatus) 10 shown in FIG. 5 comprises a reference camera 11 disposed at the above-described virtual point A, and a frame memory 12 into which picture data imaged by the reference camera 11 is stored, whereby picture imaged by reference camera 11 (hereinafter referred to as "reference picture") in which object 2 to be imaged is imaged by a calibration section 13 and picture imaged by detection cameras 3a, 3b (hereinafter referred to as "detection picture") are used to carry out calibration.

The calibration section 13 carries out processing to allow the detection cameras 3a, 3b and the reference camera 11 to undergo positioning to determine epipolar line on the detection picture to determine in advance correspondence relationship between coordinates of reference picture and detection picture to, e.g., store it as look-up table into the above-described distance picture generating section 5.

Figure 6:
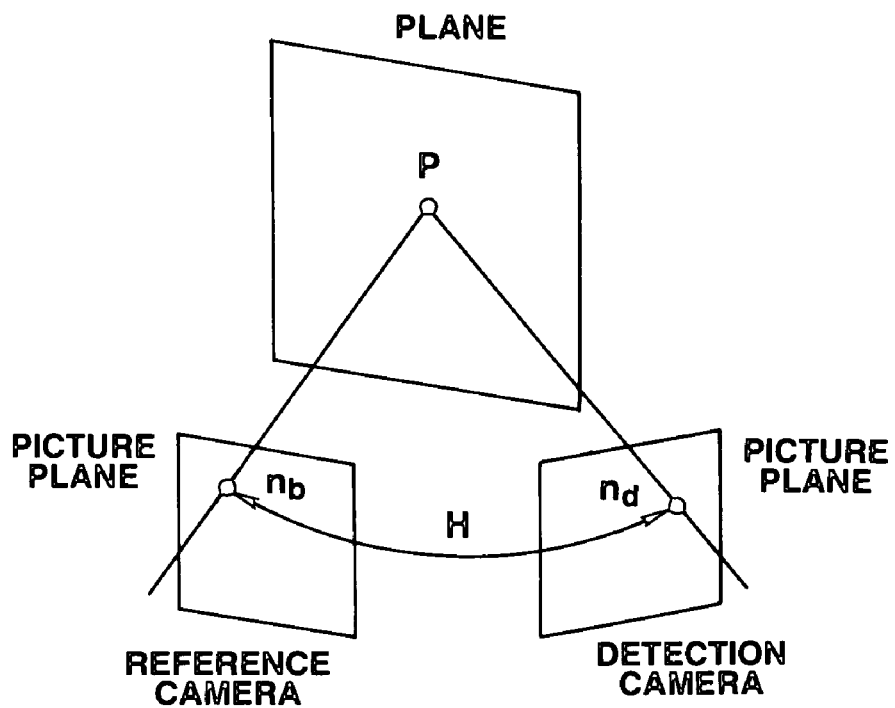
FIG. 6 is a view for explaining an example for determining epipolar lines on respective detection pictures corresponding to respective coordinates of reference picture.

This epipolar line is (straight) line where plane determined by optical centers (optical axes) of the reference camera 11 and the detection cameras 3a, 3b and observation point $n_b$ of the reference camera 11 and (surface of) picture of each of the detection cameras 3a, 3b intersect (cross) with each other. Now, explanation will be given in connection with an example for determining epipolar line on each of detection pictures corresponding to each of coordinates of reference picture. It is here assumed that, for example, as shown in FIG. 6, point P on the plane placed within three-dimensional space is observed at point $n_b$ on reference picture of the reference camera 11 and is observed at point $n_d$ on detection picture of the detection camera 3. In the case where such a relationship holds, when projection (projective) transform matrix of 3×3 for carrying out transform processing from the point $n_b$ to the point $n_d$ is assumed to be H, the point $n_d$ of the detection picture is expressed as follows:

$$nd = H \cdot nb \qquad (2)$$

Further, this distance picture generating section 5 implements a predetermined projection transform processing to reference picture imaged by the reference camera 11 while changing parameters of this projection transform matrix H to determine parameters of the projection transform matrix H so that error of luminance between detection picture and reference picture becomes minimum. By determining projection transform matrix H, the calibration section 13 can retrieve, from on the detection picture, correspondence point corresponding to an arbitrary point of the reference picture. In this example, as a method of determining projection transform matrix H in which transformed detection picture and reference picture are caused to be precisely in correspondence with each other (picture matching method), Levenberg-Marquardt minimum method (L-M method) is used. This calibration section 13 determines, every distance, projection transform matrix H by using such a technique to determine epipolar line by using the projection transform matrix H.

Figure 7:
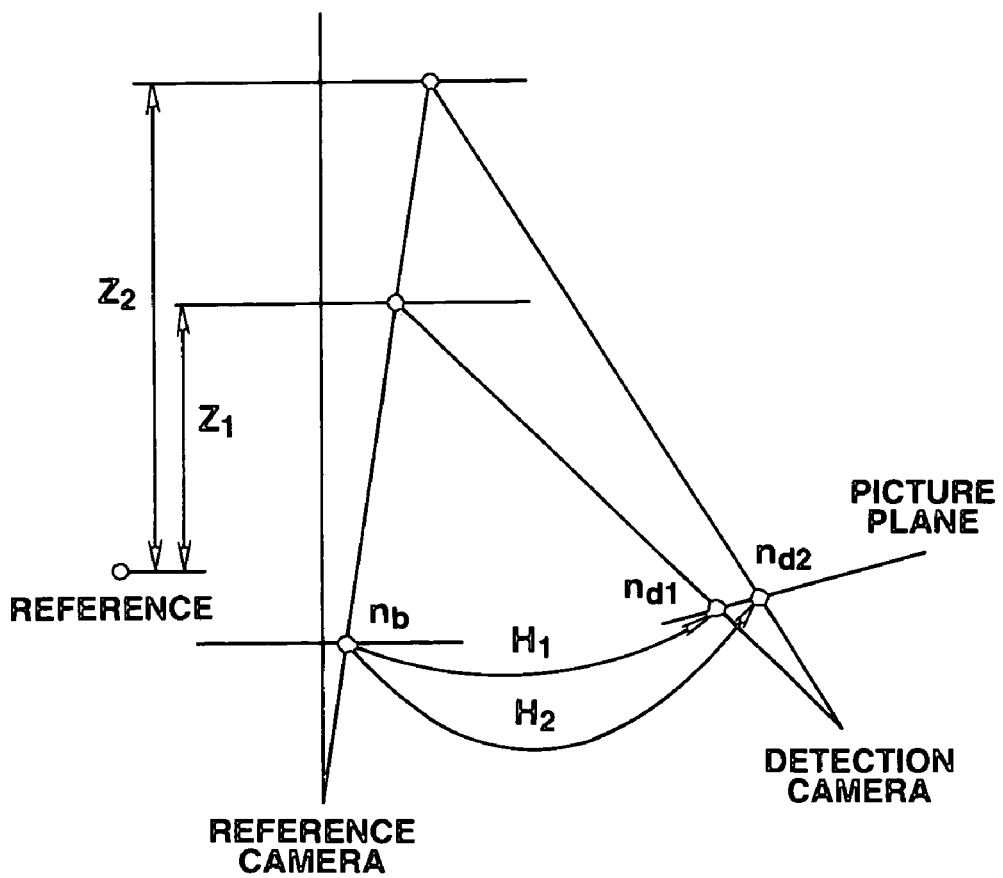
FIG. 7 is a view showing observation points $n_{d1}$ and $n_{d2}$ observed at the picture surface of detection camera in the case where object to be imaged exists at distances $Z_1$ and $Z_2$.

Namely, in this calibration section 13, as shown in FIG. 7, for example, when the above-described L-M method is used to determine projection transform matrix $H_1$ with respect to distance $Z_1$ from the reference position, point $n_{d1}$ on detection picture corresponding to point $n_b$ on the reference picture at distance $Z_1$ from the reference position can be determined. In this case, since point $n_b$ on the reference picture is arbitrary, the calibration section 13 can calculate, as point $n_d$ on detection picture, correspondence points corresponding to all points $n_b$ on reference picture by using the projection transform matrix $H_1$ at distance $Z_1$. In a manner similar to the above, the calibration section 13 determines projection transform matrix $H_2$ in the case where plane to be observed is placed at distance $Z_2$ so as to become in parallel to plane placed at position of distance $Z_1$.

Further, the calibration section 13 calculates that the point $n_b$ on the reference picture is projected onto respective points $n_{d1}$ and $n_{d2}$ on the detection picture by projection transform matrix $H_1$ and projection transform matrix $H_2$ corresponding to distance $Z_1$ and distance $Z_2$ in the case where the point $n_b$ is located at distance $Z_1$ and $Z_2$. As stated above, the calibration section 13 interpolates two points of point $n_{d1}$ and point $n_{d2}$ on the detection picture to calculate epipolar line to thereby have ability to determine the relationship of the point $n_b$ on the reference picture, the distance Z and the point $n_d$ on the detection picture. By storing such projection transform matrix H every distance Z, distance information of virtual picture to be generated by virtual, camera 3c provided at the picture generating unit 1 can be obtained by using the method which will be described later. It is to be noted that when interpolation is carried out in this way, it is necessary to set plane placed at distance positioned between the distances $Z_1$ and $Z_2$. It is to be further noted that the detail relating to the example of calibration that the above-described calibration section 13 carries out is described in the Japanese Patent Application No. 207951/1997.

As a method of determining distance Z from point $n_b$ on the reference picture and point $n_d$ on the detection picture, the following method may be employed. Namely, the calibration section 13 carries out calibration shown in FIGS. 6 and 7 on calculated epipolar line to thereby determine the relationship between point $n_b$ on reference picture and point $n_d$ on detection picture to store this relationship, e.g., into look-up table.

Figure 8:
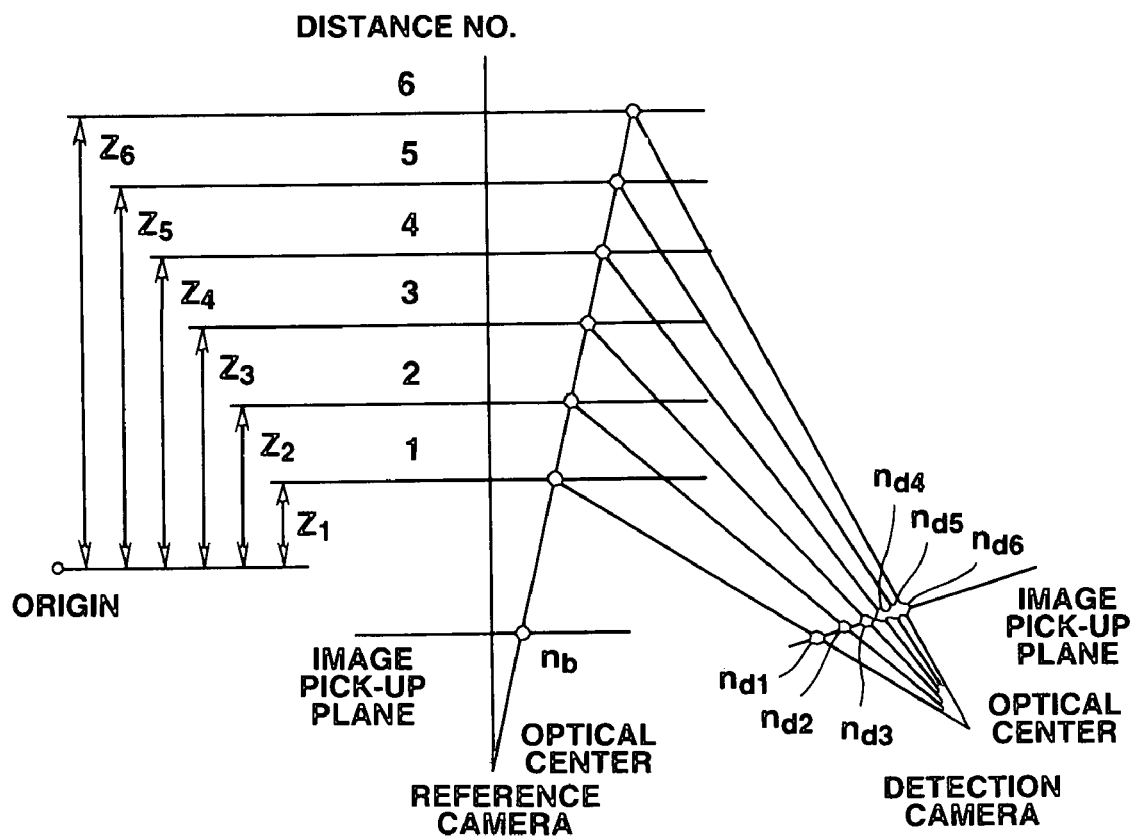
FIG. 8 is a view for explaining an example of calibration carried out on the premise that distance picture and variable-density picture are generated at distance picture generating section in this invention.

In this calibration, by using the fact that, e.g., as shown in FIG. 8, point at which there intersect (cross) line of sight connecting point $n_{d1}$ on the epipolar line of detection picture and optical center and line of sight connecting point $n_b$ on the reference picture and optical center of the reference camera 11 corresponds to distance $Z_1$ from the reference camera 11 up to object to be imaged, distance $Z_1$ is caused to be distance number "1". This epipolar line is calculated by using the above-described projection transform matrix H. Moreover, point where there are intersect (cross) line of sight connecting point $n_{d2}$ on the epipolar line of detection picture and optical center and line of sight connecting point $n_b$ on the reference picture and optical center of reference camera 11 corresponds to distance $Z_2$ from the reference camera 11 up to the object to be imaged. At this time, distance $Z_2$ is caused to be distance number "2".

In this way, the calibration section 13 detects, as distance numbers 1 to 6, distances $Z_1$ to $Z_6$ corresponding to the points where lines of sight connecting points $n_{d1}$ to $n_{d6}$ on epipolar lines of detection picture and line of sight connecting point $n_b$ on the reference picture and optical center of the reference camera 11 intersect or cross with each other successively with respect to points $n_{d1}$ to $n_{d6}$ of detection picture to thereby carry out calibration before distance picture generation carried out at the above-described picture generating apparatus 1. Further, the calibration section 13 can obtain distance numbers 1 to 6 of pictures to be imaged at point $n_b$ on the reference picture from the relationship between point $n_b$ on the reference picture and point $n_d$ on the detection picture.

In addition, the calibration section 13 may set respective planes with respect to respective distances $Z_1$ to $Z_6$ to generate respective projection transform matrices indicating correspondence relationship between point $n_b$ on the reference picture and point $n_d$ on the detection picture, and, e.g., may set planes only with respect to three distances of distances $Z_1$, $Z_3$, $Z_6$ to determine projection transform matrix indicating correspondence relationship between point $n_b$ on the detection picture and point $n_d$ on the detection picture thereafter to determine, by interpolation, projection transform matrix with respect to distances $Z_2$, $Z_4$ positioned between distances $Z_1$, $Z_3$, $Z_6$.

Namely, this calibration section 13 successively carries out, on the epipolar line, calibration of point $n_d$ on the detection picture corresponding to point $n_b$ on the reference picture from the optical center (optical axis) to thereby determine correspondence points $n_{d1}$ to $n_{d6}$ on the epipolar line to thereby determine distances $Z_1$ to $Z_6$ to allow correspondence points $n_{d1}$ to $n_{d6}$ and distance numbers 1 to 6 to have correspondence relationship therebetween to determine the relationship between point $n_b$ on the reference picture and point $n_d$ on the detection picture to prepare look-up table as shown in FIG. 9, for example.

In this FIG. 9, there are stored, e.g., points ($n_{d1}$, $n_{d2}$, $n_{d3}$, . . . ) on detection picture that detection camera 3a located at distances ($Z_1$, $Z_2$, $Z_3$, . . . ) corresponding to a certain point $n_b$ existing on the reference picture has imaged and points ($n_{d1}$, $n_{d2}$, $n_{d3}$, . . . ) on detection picture that detection camera 3b located thereat has imaged. Further, such look-up tables are generated, e.g., every respective pixels on reference pictures, and reference is made to pixels on the reference picture in the calibration section 13 as pixels on the virtual picture when distance picture is generated at the picture generating unit 1.

Explanation will now be given with reference to the flowchart of FIG. 10 in connection with the example where, at the distance picture generating section 5 provided in the picture generating unit (apparatus) 1, picture data generated at detection cameras 3a, 3b are used to generate distance picture and variable-density picture by making reference to look-up table generated in the above-described calibration unit 10.

Figure 10:
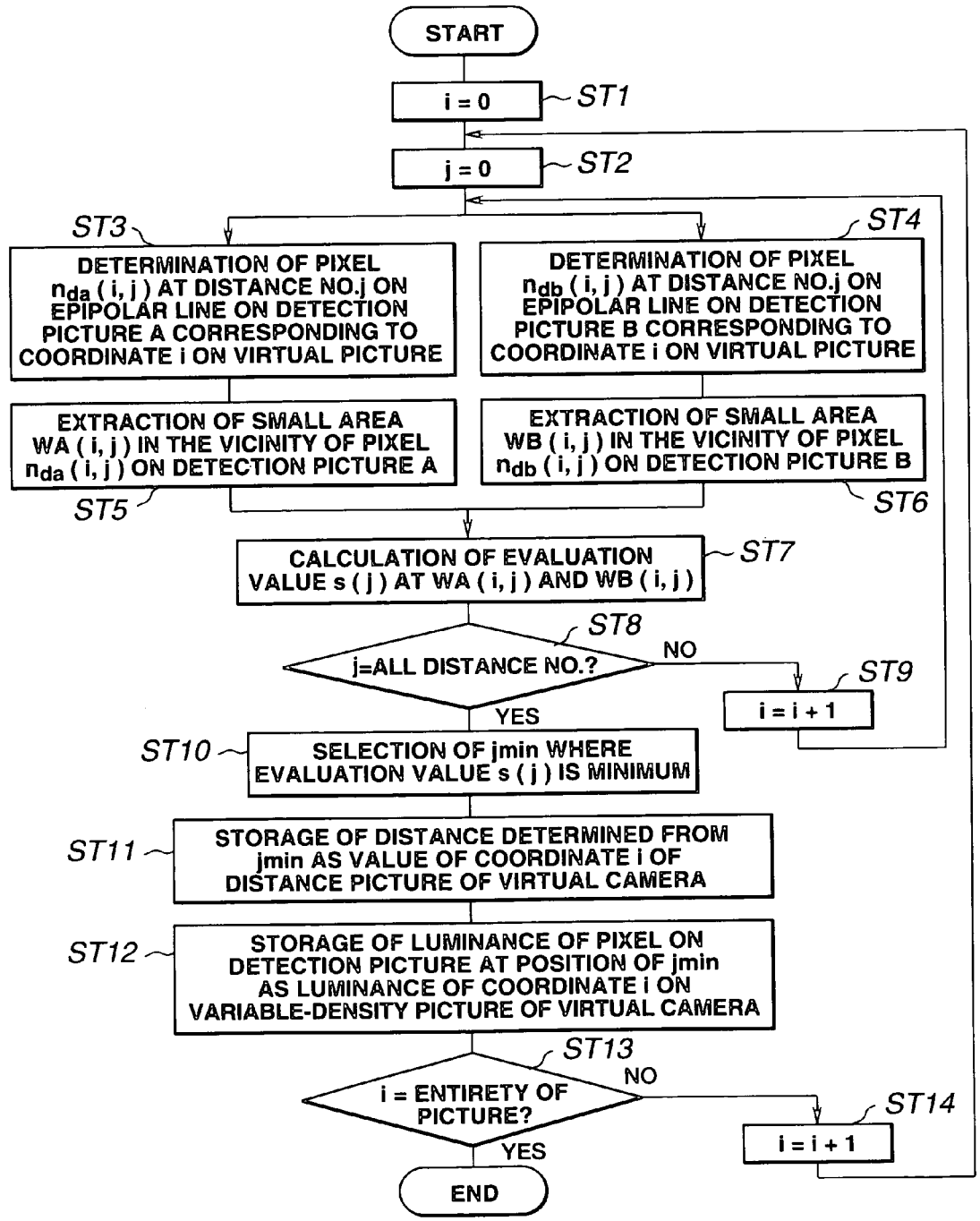
FIG. 10 is a flowchart showing an example of processing when distance picture and variable-density picture are generated at distance picture generating section provided in the picture generating apparatus according to this invention.

In accordance with the flowchart shown in FIG. 10, initially, at step ST1, the distance picture generating section 5 initializes coordinate i of pixel of picture data of virtual picture of virtual camera 3c to thereby set i to zero (i=0).

Subsequently, at step ST2, the distance picture generating section 5 initializes distance number j corresponding to resolution in the distance direction when calibration is carried out to set j to zero (j=0). Thus, the processing proceeds to step ST3 and step ST4.

Figure 11:
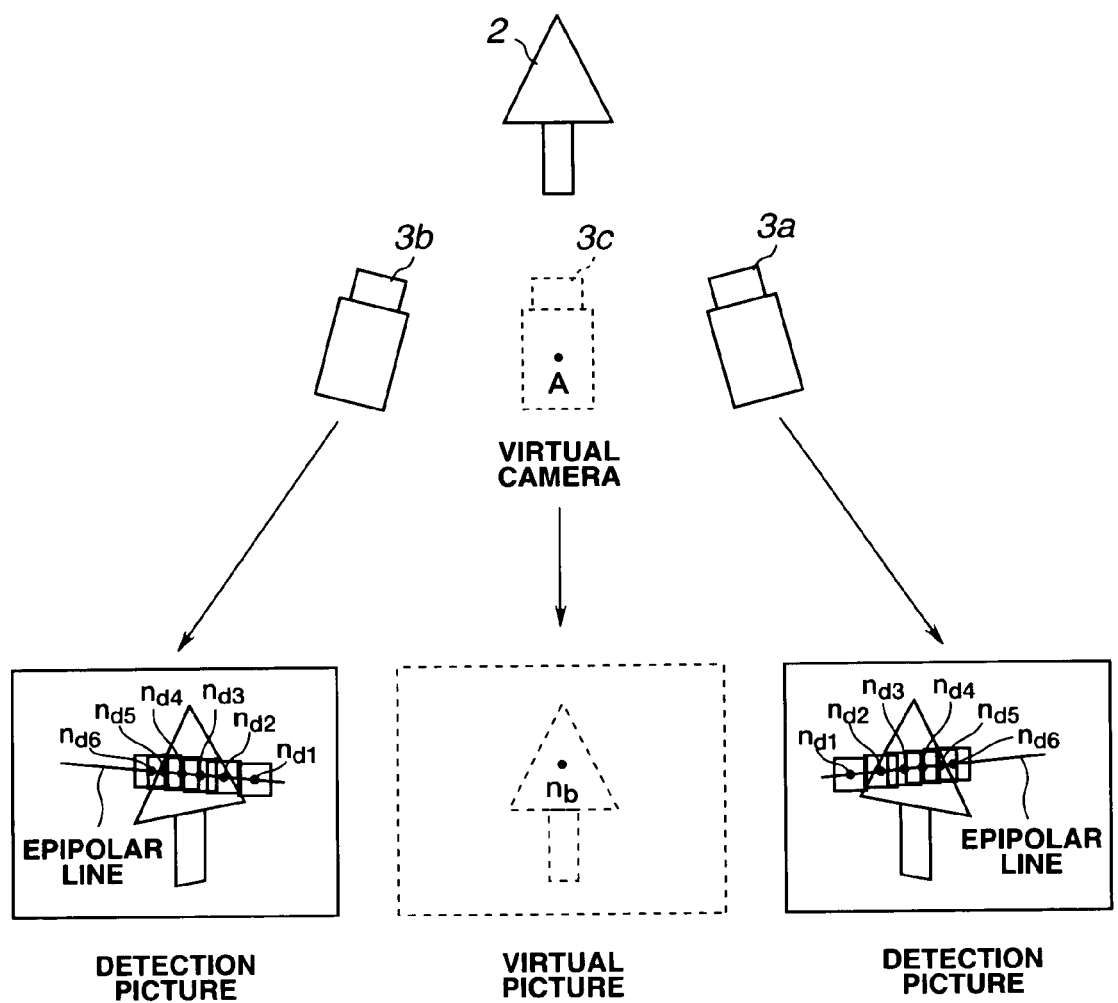
FIG. 11 is a view for explaining derivation of pixels ($n_{d1}$ to $n_{d6}$) every distance number on epipolar lines of detection pictures corresponding to coordinate $n_b$ on picture that virtual camera should image.

At the step ST3, as shown in FIG. 11, the distance picture generating section 5 derives (generates) pixels $n_{da}$ (i, j) ($n_{d1}$ to $n_{d6}$) at distance number j on the epipolar line of detection picture corresponding to coordiante i ($n_b$) on picture that the virtual camera 3c should image. Namely, when coordiante i on the virtual picture that the camera 3c should image is determined at step ST1, the distance picture generating section 5 detects, from the look-up table, pixel $n_{da}$ (i, j) on the epipolar line of the detection camera 3a determined by the above-described processing. Thus, the processing proceeds to step ST5. It is to be noted that position of determined (detected) pixel $n_{da}$ (i, j) of detection picture may be represented by sub-pixels in addition to integer value.

At the step ST5, the distance picture generating section 5 extracts, as small area WA (i, j), the portion in the vicinity of pixel $n_{da}$ (i, j) at distance number j determined at the above-described step ST3 with the pixel $n_{da}$ (i, j) being as center.

On the other hand, the distance picture generating section 5 carries out, at step ST4, also with respect to detection camera 3b, the processing which has been explained at the above-described step ST3. Namely, this distance picture generating section 5 detects, from the look-up table, pixel $n_{db}$ (i, j) at distance number j on epipolar line on detection picture that detection camera 3b has imaged corresponding to coordinate i on picture that the virtual camera 3c should image. Thus, the processing proceeds to step ST6.

Also at step ST6, the distance picture generating section 5 carries out processing similar to the above-described step ST5 with respect to the detection camera 3b. Namely, the distance picture generating section 5 extracts, as small area WB (i. j), the portion in the vicinity of pixel $n_{db}$ (i, j) at distance number j determined at the above-described step ST4 with the pixel $n_{db}$ (i, j) being as center.

Then, at step ST7, the distance picture generating section 5 compares small area WA (i,j) extracted at the above-described step ST5 and small area WB (i,j) extracted at the step ST6 to thereby calculate correlation to obtain evaluation value s(j). Here, the evaluation value s(j) indicates correlation at the distance number j, and is calculated, e.g., by the following formula.

$$\sum_{i \in W} |I(x+i) - I'(x'+i)| \qquad (3)$$

According as correlation becomes higher, it is indicated that (the degreee of) analogousness between small area WA (i,j) and small area WB (i,j) becomes higher. Moreover, as the result of the fact that the evaluation value s(j) is calculated by the above-mentioned formula (2) in correspondence with correlation at the distance picture generating section 5, according as correlation becomes higher, the evaluation value has smaller value. Namely, this distance picture generating section 5 compares luminance pattern of small area WA (i,j) of detection picture generated by the detection camera 3a and that of small area WB (i,j) of detection picture generated by the detection camera 3b to thereby generate (the degree of) analogousness as evaluation value so).

Then, at step ST8, the distance picture generating section 5 recognizes distance number j to thereby judge whether or not evaluation values s(j) have been calculated with respect to all distance numbers. When it is judged that the section 5 has carried out processing with respect to all distance numbers j, the processing proceeds to step ST 10. On the other hand, when it is judged that the section 5 has not yet carried out processing with respect to all distance numbers j, the processing proceeds to step ST9 to increment distance number j. Thus, the processing proceeds to steps ST3 and ST4. Namely, the distance picture generating section 5 carries out the processing explained at the above-described steps ST3 to ST7 in connection with all distance numbers j with respect to coordinates i of pixels of virtual picture of virtual camera 3c.

Figure 12:
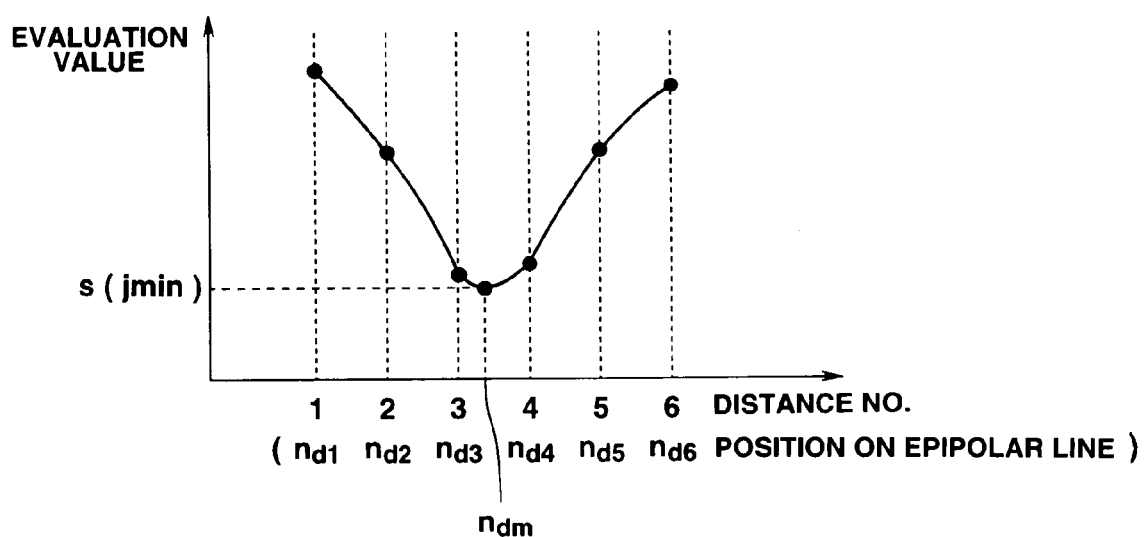
FIG. 12 is a view showing the relationship between evaluation value and distance number.

Then, at step ST 10, the distance picture generating section 5 selects evaluation value $s(j_{min})$ having minimum value of respective evaluation values s(j) in connection with all distance numbers j with respect to coordinate i of virtual picture. When evaluation values s(j) corresponding to distance numbers 1 to 6 are obtained at the distance picture generating section 5, as shown in FIG. 12, for example, evaluation value $s(j_{min})$ having minimum value when distance number is "3" is obtained. At this time, the distance picture generating section 5 may interpolate between respective evaluation values s(j) obtained at the step ST7 to determine minimum evaluation value $s(j_{min})$. The distance picture generating section 5 is operative so that when interpolation is made to obtain minimum evaluation value $s(j_{min})$, the value in which the distance number $n_{dm}$ is "3,3" is obtained as minimum evaluation value $s(j_{min})$. Accordingly, this distance picture generating section 5 obtains evaluation value $s(j_{min})$ by interpolation to thereby permit accuracy of evaluation value to be high.

Then, at step ST11, the distance picture generating section 5 stores, as distance information of coordinate i of distance picture imaged by the virtual camera 3c, distance Z corresponding to distance number j that the evaluation value $s(j_{min})$ having minimum value obtained at the above-described step ST10 indicates.

Then, at step ST12, the distance picture generating section 5 stores, as luminance information at coordinate i of virtual picture, e.g., one value or both values of pixels of detection picture imaged by the detection camera 3a and detection picture imaged by the detection camera 3b corresponding to distance number j that evaluation value $s(j_{min})$ having minimum value obtained at the above-described step ST10 indicates.

Then, at step ST13, the distance picture generating section 5 carries out the above-described processing of steps ST3 to ST12 with respect to respective coordinates i on the virtual camera 3c to thereby judge whether or not processing for determining distance information and luminance information have been made with respect to all coordinates i of the virtual picture. Further, when the distance picture generating section 5 has judged that distance information and luminance information are obtained with respect to all coordinates i, it completes the processing. On the other hand, when the section 5 has judged that distance information and luminance information are not determined with respect to all coordinates i, it increments value of coordinate i at step ST14. Thus, the processing returns to the step ST2 to carry out processing of steps ST2 to ST12 with respect to the incremented coordiante i+1 to repeat processing until distance information and luminance information are determined with respect to all coordinates i.

The picture generating unit 1 provided with such distance picture generating section 5 can generate distance picture indicating distance from virtual point A where camera is primarily disposed up to object 2 to be imaged and variable-density picture when the object 2 to be imaged is imaged from the virtual point A by only detection cameras 3a, 3b without disposing camera at virtual position with respect to virtual picture to be generated at the virtual camera 3c. Accordingly, in accordance with this picture generating unit 1, it is possible to generate distance picture having distance information with respect to respective pixels which cannot be electronically generated as picture only by the virtual camera 3c.

Moreover, in accordance with the picture generating unit 1, when distance picture and variable-density picture from virtual camera disposed at virtual position are generated, camera is actually located (disposed) at the position from the virtual camera to carry out calibration, thereby making it possible to generate distance picture and variable-density picture to be generated by the virtual camera without necessity to carry out complicated processing such that expansion is made into the coordinate system of the three-dimensional space of object to be imaged as in the prior art.

Further, in accordance with this picture generating unit (apparatus) 1, in the case where, e.g., there exists screen for displaying picture at the front of user, even in the state where camera cannot be disposed at the front of user, plural detection cameras 3 are disposed at the periphery of user, whereby image pick-up operation is made from the front of user, thus making it possible to generate distance picture and variable-density picture to be generated.

Furthermore, in accordance with this picture generating unit (apparatus) 1, there may be disposed, at position of the virtual camera 3c, image pick-up camera of high fineness or camera of the type different from detection cameras 3a, 3b like camera using film, etc. Such picture generating unit 1 can pick up image of variable-density picture consisting of luminance information and color information independently of processing for measuring distance between virtual camera 3c disposed at virtual position and object 2 to be imaged, and can also measure distance of object 2 to be imaged which has been imaged by ordinary camera disposed at virtual position where virtual camera 3c is disposed.

Figure 13:
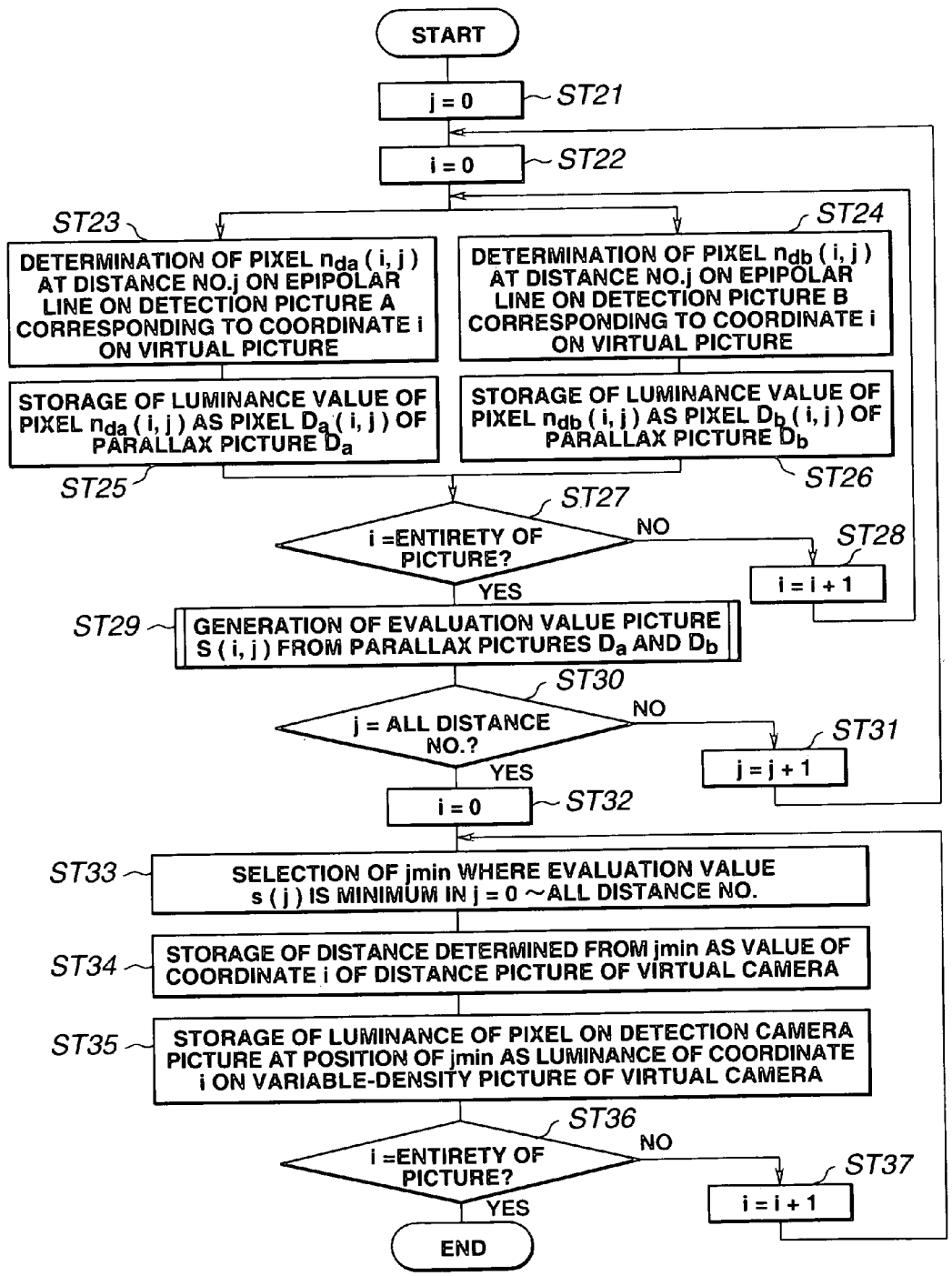
FIG. 13 is a flowchart showing another example of processing when distance picture and variable-density picture are generated at distance picture generating section provided in the picture generating apparatus according to this invention.

Explanation will now be given with reference to the flowchart shown in FIG. 13 in connection with another example where the distance picture generating section 5 generates distance picture and variable-density picture by using picture data generated by detection cameras 3a, 3b.

Initially, at step ST21, this distance picture generating section 5 initializes distance number j corresponding to resolution in distance direction when calibration is carried out to set j to zero (j=0).

Then, at step ST22, the distance picture generating section 5 initializes coordinates i of respective pixels on virtual picture of virtual camera 3c to set i to zero (i=0). Thus, the processing proceeds to step ST23 and step ST24.

At the step ST23, the distance picture generating section 5 derives pixel $n_{da}(i, j)$ at distance number j on epipolar line on detection picture that detection camera 3a has imaged corresponding to coordinate i on virtual picture that virtual camera 3c should image similarly to the above-described step ST3. Thus, the processing proceeds to step ST25.

At the step ST25, the distance picture generating section 5 stores, as pixel Da(i) of parallax picture Da, luminance value of pixel $n_{da}(i, j)$ derived at the above-described step ST23.

On the other hand, at the step ST24, the distance picture generating section 5 derives, similarly to the above-described step ST4, pixel $n_{db}(i, j)$ at distance number j on epipolar line on detection picture corresponding to coordinate i on virtual picture that virtual camera 3c should image. Thus, the processing proceeds to step ST26.

Further, at the step ST26, the distance picture generating section 5 stores, as pixel $D_b(i)$ of parallax picture $D_b$, luminance value of pixel $n_{db}(i, j)$ derived at the above-described step ST24.

As stated above, the distance picture generating section 5 carries out processing indicated by step S25 and step ST26 to thereby store pixels Da(i), Db(i) of parallax pictures Da, Db at distance number j of respective detection cameras 3a, 3b at coordiante i=0 of virtual picture. At this time, the distance picture generating section 5 derives, by making reference to the look-up table, pixels Da(i), Db(i) corresponding to distance number j when areas on epipolar lines of respective detection pictures are calibrated by the calibration unit 10.

Then, at step ST27, the distance picture generating section 5 judges whether or not pixels Da(i), Db(i) of parallax pictures Da, Db are stored with respect to all coordinates i of virtual picture at distance number j. Further, when the distance picture generating section 5 has judged that pixels Da(i), Db(i) of parallax pictures Da, Db are stored with respect to all coordinates i, the processing proceeds to step ST29. On the other hand, when the section 5 has judged that such pixels are not stored with respect to all coordiantes i, the coordiante i is incremented at step ST28 so that coordinate i+1 result. Thus, the processing returns to the step ST23 and the step ST24 for a second time. Namely, the distance picture generating section 5 repeats processing of step ST23 to step ST28 until pixels Da(i), Db(i) of parallax pictures Da, Db are stored with respect to all coordinates i at distance number j.

At step ST29, the distance picture generating section 5 compares, by using above-mentioned formula (1), pixel Da(i, j) included in parallax picture Da and pixel Db(i, j) included in parallax picture Db which are obtained by carrying out the above-described processing of steps ST23 to ST28 to thereby determine correlation between detection picture imaged by the detection camera 3a and detection picture imaged by the detection camera 3b to determine evaluation value s(i, j) corresponding to correlation with respect to each pixel. Further, the distance picture generating section 5 generates evaluation value picture S(i, j) consisting of evaluation value s(i, j) of coordinate i at distance j. It is to be noted that the detail with respect to processing for generating this evaluation value picture S(i, j) will be described later.

Then, at step ST30, the distance picture generating section 5 recognizes distance number j to thereby judge whether or not evaluation value pictures S(i, j) have been generated with respect to all distance numbers j. When processing have been carried out with respect to all distance numbers j, the processing proceeds to step ST32. On the other hand, when processing have not been carried out with respect to all distance numbers j, the processing proceeds to step ST31 to increment distance number j to allow the distance number to be j+1 to repeat processing of steps ST23 to ST31 for a second time.

At the step ST32, coordinates i of respective pixels on virtual picture of the virtual camera 3c are initialized so that coordinate i=0 results.

Then, at step ST33, the distance picture generating section 5 retrieves value where evaluation value s(j) which is value of evaluation value picture S(i, j) every distance number j at coordiante i obtained by the above-described processing is minimum to derive (generate) distance number $j_{min}$ corresponding to pixel s(i, $j_{min}$) having minimum evaluation value. In addition, this distance picture generating section 5 may interpolate respective evaluation values s(j) every respective distance numbers j to determine minimum evaluation value s($j_{min}$). As stated above, the distance picture generating section 5 determines, by interpolation, minimum evaluation value S($j_{min}$), thereby permitting accuracy of the evaluation value s(j) to be higher.

Then, at step ST34, the distance picture generating section 5 stores, as distance information of coordinate i of distance picture imaged by the virtual camera 3C, distance Z corresponding to distance number $j_{min}$ that the minimum evaluation value s(i, $j_{min}$) obtained at the above-described step ST33 indicates.

Then, at step S35, the distance picture generating section 5 stores, as luminance information at position i of virtual picture, e.g., one value or average (mean) value of both values of luminance information of pixels of detection picture imaged by detection camera 3a and detection picture imaged by detection camera 3b corresponding to distance number $j_{min}$ that the minimum evaluation value s(i, $j_{min}$) obtained at the above-described step ST33 indicates.

Then, at step ST36, the distance picture generating section 5 carries out, with respect to respective positions i of pixels on the virtual camera 3c, the above-described processing of step ST33 to step ST35 to thereby judge whether or not processing for determining distance information and luminance information are carried out with respect to all coordinates i of virtual picture. Further, when it is judged that distance information and luminance information are determined with respect to all coordinates i, the distance picture generating section 5 completes the processing. On the other hand, when it is judged that distance information and luminance information are not determined with respect to all coordinates i, the coordinate i is incremented at step ST37. Thereafter, the processing returns to the step ST 33. Thus, the distance picture generating section 5 carries out processing of step ST33 to step ST36 with respect to the incremented coordinate i+1 to repeat processing of steps ST33 to step ST37 until distance information and luminance information have been determined with respect to all coordinates i.

Figure 14:
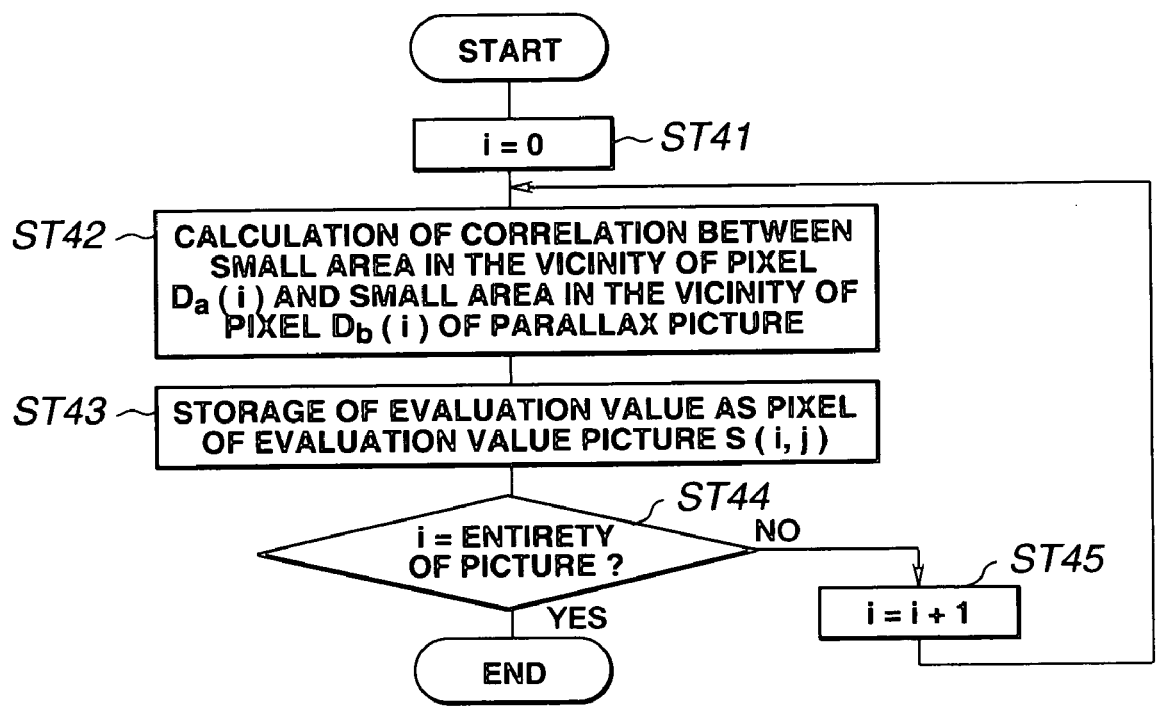
FIG. 14 is a flowchart showing an example of processing when evaluation value picture is generated at distance picture generating section provided in the picture generating apparatus according to this invention.

An example for generating evaluation value picture S(i, j) from parallax picture Da and parallax picture Db at the above-described step ST29 will now be described with reference to FIG. 14.

At the time of generating evaluation value picture S(i, j), the distance picture generating section 5 initializes, initially, at step ST41, coordinate i of picture of evaluation value picture S(i, j) into zero (0).

Then, at step ST42, the distance picture generating section 5 compares luminance patterns of small area in the vicinity of parallax picture Da(i) and small area in the vicinity of parallax picture Db(i) to thereby calculate evaluation value s(j) every small area. As a result, there exists evaluation value s(j) corresponding to distance number j as information of each pixel. At this time, the distance picture generating section 5 may calculate evaluation value s(j) by using the above-mentioned formula (1).

Then, at step ST43, the distance picture generating section 5 stores, as pixels of evaluation value picture S(i, j), evaluation values obtained by calculation at the above-described step ST42.

Then, at step ST44, the distance picture generating section 5 judges whether or not pixels of evaluation value picture S(i, j) are generated with respect to the entirety of picture on screen. When it is judged that storage has been carried out as pixels of evaluation value picture S(i, j) with respect to all pixels from coordinate i of virtual picture, the processing is completed. When it is judged that storage has not yet been carried out as pixels of evaluation value picture S(i, j) with respect to all pixels from coordinate i, the coordinate i is incremented into coordinate i+1. The section 5 carries out processing of step ST42 and step ST43 for a second time to repeat processing until pixels of evaluation value picture S(i, j) are stored resultantly with respect to all coordinates i.

As stated above, the picture generating unit 1 can generate distance picture indicating distance from the position where camera is primarily disposed until object 2 to be imaged and variable-density picture when the object 2 to be imaged is imaged from virtual camera 3c by only detection cameras 3a, 3b without disposing camera at virtual position with respect to virtual picture to be generated at virtual camera 3c.

Further, this picture generating unit (apparatus) 1 compares luminance patterns of small area in the vicinity of parallax picture Da(i) and small area in the vicinity of parallax picture Db(i) to thereby calculate evaluation values s(j) every small areas to calculate coordinates of virtual picture while successively incrementing such coordinate to thereby generate evaluation value picture S(i, j) every respective distance numbers to select minimum evaluation value S($j_{min}$) to generate distance picture consisting of distance information and variable-density picture consisting of luminance information. Thus, quantity of calculations can be reduced as compared to the above-described processing shown in FIG. 10 or FIG. 12.

It is to be noted that while, in the processing of the distance picture generating section 5 which has been explained with reference to the above-described flowcharts, the example for determining distance information and luminance information with respect to coordiantes i of the entirety of virtual picture has been described, distance information and luminance information may be determined with respect to a portion of coordinates i of virtual picture.

Moreover, at the time of calibration carried out on the premise of the processing of the distance picture generating section 5 which has been explained with reference to the above-described flowcharts, such an approach may be employed to, e.g., project pattern light onto the plane to be imaged to thereby paste texture onto the object to be imaged. As stated above, the picture generating unit 1 pastes texture onto object to be imaged at the time of calibration, thereby making it possible to improve accuracy of calibration to improve accuracy of distance measurement.

In addition, in order to improve accuracy of distance measurement, this picture generating unit (apparatus) may comprise: camera for projecting, e.g., pattern light of infrared area onto object to be imaged, disposed at position where virtual camera 3c is disposed and including infrared ray shielding filter; and detection cameras 3 positioned therearound. At this time, camera in which calibration has been carried out is used as it is as virtual camera. Thus, this picture generating unit (apparatus) 1 receives pattern light of infrared area by the detection cameras disposed therearound to generate distance picture, and to generate variable-density picture by camera disposed at the position where virtual camera 3c is disposed. At this time, picture generated by camera disposed at the position where virtual camera 3c is disposed is utilized as variable-density picture as it is.

INDUSTRIAL APPLICABILITY

As explained above in detail, the picture generating apparatus according to this invention comprises: correlation detecting means for comparing, with each other, on epipolar line determined by connecting correspondence points of line of sight connecting virtual position and object to be imaged and line of sight connecting position of each image pick-up means and the object to be imaged, respective picture data generated by the respective image pick-up means to detect correlation therebetween; and distance picture generating means for generating distance picture indicating distance between virtual position and object to be imaged on the basis of correlation detected by the correlation detecting means, whereby picture data generated by two image pick-up means or more are used to compare, at the correlation detecting means, picture data generated by the respective image pick-up means to detect correlation therebetween. Accordingly, it is possible to generate, without disposing camera at the virtual position, distance picture indicating distance from the virtual position to the object to be imaged and variable-density picture when the object to be imaged is imaged from the virtual position.

In addition, the picture generating method according to this invention comprises: comparing, with each other, on epipolar line determined by connecting correspondence points of line of sight connecting virtual position and object to be imaged and line of sight connecting position of each image pick-up means and the object to be imaged, respective picture data generated by the respective image pick-up means to detect correlation therebetween. Accordingly, it is possible to generate, on the basis of the detected correlation, distance picture indicating distance from virtual position to object to be imaged and variable-density picture when the object to be imaged is imaged from the virtual position.

The invention claimed is:

1. A picture generating apparatus, comprising:
   at least two image pick-up means, for picking up an image of an object to be imaged, respectively disposed at different positions;
   correlation detecting means for comparing, with each other, on an epipolar line which is an intersection line of an image pick-up plane of the image pick-up means and a plane determined by a line of sight connecting a virtual position and the object to be imaged, and a line connecting an optical center of the virtual position and an optical center of a detection camera, respective picture data generated by the respective image pick-up means to detect correlation therebetween; and
   distance picture generating means for generating distance picture indicating distance between a virtual position and the object to be imaged on the basis of the correlation detected by the correlation detecting means.

2. A picture generating apparatus as set forth in claim 1, wherein the correlation detecting means compares, with each other, picture data of small areas consisting of plural pixel data positioned on the epipolar line to detect correlation therebetween.

3. A picture generating apparatus as set forth in claim 1, which comprises variable-density (gradation) picture generating means for generating variable-density picture when the object to be imaged is imaged from the virtual position on the basis of respective picture data generated by the respective image pick-up means,
   wherein the variable-density picture generating means generates variable-density picture by using luminance information of picture data generated by the respective image pick-up means.

4. A picture generating apparatus as set forth in claim 1, which comprises a reference camera disposed at the virtual position, wherein the reference camera generates variable-density picture of the object to be imaged, and wherein the distance picture generating means generates distance picture indicating distance between the reference camera and the object to be imaged on the basis of picture data generated by the two image pick-up means or more.

5. A picture generating apparatus as set forth in claim 4, which comprises:
   light emitting means for irradiating pattern light of a predetermined area onto the object to be imaged; and
   filter means for shielding pattern light of the predetermined area incident to the reference camera,
   wherein the reference camera generates variable-density picture of the object to be imaged, and
   wherein the distance picture generating means generates distance picture indicating distance between the reference camera and the object to be imaged on the basis of picture data that the two image pick-up means or more generate by using light reflected from the object to be imaged onto which the pattern light is irradiated.

6. A picture generating apparatus as set forth in claim 4, wherein the reference camera is used for generating distance data indicating the relationship between pictures imaged by the respective image pick-up means and distance between the virtual position and the object to be imaged.

7. A picture generating apparatus as set forth in claim 1, wherein the correlation detecting means compares, with each other, picture data on each epipolar line corresponding to distance between the virtual position and the object to be imaged to detect correlations every respective distances with respect to respective pixel blocks consisting of at least one pixel constituting distance picture, and
   wherein the distance picture generating means allows distance in picture data having highest correlation of correlations every respective distances detected by the correlation detecting means to be distance with respect to the object to be imaged of pixel block of the distance picture.

8. A picture generating apparatus as set forth in claim 7, which comprises variable-density picture generating means for generating picture data when the object to be imaged is imaged from the virtual position by using plural picture data imaged by the respective image pick-up means on epipolar line corresponding to distance having highest correlation.

9. A picture generating apparatus as set forth in claim 1, wherein the correlation detecting means carries out, with respect to all distances, processing to compare, with each other, picture data indicating a predetermined distance of plural picture data on each of the epipolar lines corresponding to distance between the virtual position and the object to be imaged to detect correlation in regard to the predetermined distance with respect to the entirety of the distance picture, and
   wherein the distance picture generating means allows distance in each of picture data having highest correlation every respective distances every respective pixel blocks consisting of at least one pixel constituting respective distance pictures to be distance with respect to the object to be imaged in regard to each of pixel blocks.

10. A picture generating apparatus as set forth in claim 9, which comprises variable-density picture generating means for generating picture data when the object to be imaged is imaged from the virtual position by using plural picture data imaged by the respective image pick-up means on the epipolar line corresponding to distance having highest correlation.

11. A picture generating method, comprising:
   picking up an image of an object to be imaged by at least two image pick-up means respectively disposed at different positions to generate picture data;
   comparing, with each other, on an epipolar line which is an intersection line of an image pick-up plane of the image pick-up means and a plane determined by a line of sight connecting a virtual position and the object to be imaged, and a line connecting an optical center of the virtual position and an optical center of a detection, respective picture data generated by the respective image pick-up means to detect correlation therebetween; and generating distance picture indicating distance between virtual position and the object to be imaged on the basis of the detected correlation therebetween.

12. A picture generating method as set forth in claim 11, wherein picture data of small areas consisting of plural pixel data located on the epipolar line are compared with each other to detect correlation therebetween.

13. A picture generating method as set forth in claim 11, wherein luminance patterns of respective picture data generated by the respective (solid-state) image pick-up means (devices) are used to generate variable-density (gradation) picture.

14. A picture generating method as set forth in claim 11, which comprises:
    comparing, with each other, respective picture data imaged by the (solid-state) two image pick-up means (devices) or more to detect correlation of the entirety of picture; and
    generating distance picture indicating distance between the virtual position and the object to be imaged on the basis of the correlation of the entirety of the picture.

15. A picture generating method as set forth in claim 11, which comprises:
    comparing, with each other, picture data on each epipolar line corresponding to distance between the virtual position and the object to be imaged;
    detecting correlations every respective distances with respect to respective pixel blocks consisting of at least one pixel constituting the distance picture; and
    allowing distance in each picture data having highest correlation of correlations every respective distances to be distance between the virtual position and the object to be imaged.

16. A picture generating method as set forth in claim 15, wherein plural picture data imaged by the respective (solid-state) image pick-up means (devices) on epipolar line corresponding to distance in each of the picture data having highest correction are used to generate picture data when the object to be imaged is imaged from the virtual position.

17. A picture generating method as set forth in claim 11, wherein a procedure is taken to carry out processing with respect to all distances to compare, with each other, picture data indicating a predetermined distance of plural picture data on each epipolar line corresponding to distance between the virtual position and the object to be imaged to detect, in connection with the entirety of the distance picture, correlations with respect to the predetermined distance, and
    wherein a further procedure is taken to allow distance in each of the picture data having highest correlation of correlations every respective distances, every respective pixel blocks consisting of at least one pixel constituting respective distance pictures, to be distance with respect to the object to be imaged in regard to each of pixel blocks.

18. A picture generating method as set forth in claim 17, wherein plural picture data imaged by (solid-state) image pick-up means (devices) on epipolar line corresponding to distance in each of the picture data having highest correlation are used to generate picture data when the object to be imaged is imaged from the virtual position.

* * * * *